BIDIRECTIONAL COLD-CATHODE COUNTING CONTROL CIRCUIT

Filed Jan. 30, 1961

INVENTOR.
VERNON J. MEYERS

BY

ATTORNEYS

United States Patent Office 3,098,946

Patented July 23, 1963

3,098,946
BIDIRECTIONAL COLD-CATHODE COUNTING CONTROL CIRCUIT

Vernon J. Meyers, San Diego, Calif., assignor to the United States of America as represented by the Secretary of the Navy Filed Jan. 30, 1961, Ser. No. 85,923
8 Claims. (Cl. 315—84.6)
(Granted under Title 35, U.S. Code (1952), sec. 266)

The invention described herein may be manufactured and used by or for the Government of the United States of America for governmental purposes without the payment of any royalties thereon or therefor.

The present invention relates in general to counting circuits and in particular is a bidirectional cold-cathode counting circuit which may be used in combination with a decade counter glow transfer tube for digital addition and subtraction indications.

In various types of electronic apparatus, it is necessary to render effective a predetermined sequence of circuits or components in order to produce any number of alternately desired results. For practical purposes, in counting apparatus, it is usually necessary to present count indications of some sort or another. Thus, to date, the glow transfer tube has been found to be satisfactory in many instances for this purpose. Unfortunately, the sequential operation of the components in this tube has not been optimized, inasmuch as the prior art counting circuits which act as the feed circuits therefor do not seem to provide optimum type input signals thereto. Consequently the operational results may be erratic and unstable. Moreover, with respect to glow transfer tube counting indicators in particular, very often counts are skipped, counts do not occur, miscounts may exist in random fashion, and a reasonable degree of counting accuracy is contingent upon extremely accurate add and subtract input signals being applied thereto, due essentially to the inherent ionization time characteristics existing therein.

The subject invention overcomes these difficulties and, therefore, enables vastly improved operational results to be obtained.

It is therefore, an object of this invention to provide an improved bidirectional cold-cathode counting circuit.

Another object of this invention is to provide an improved electronic counting control circuit that enables a decade counter tube to both add and subtract.

Another object of this invention is to timely provide counter tube input signals that substantially match the input requirements thereof for optimum operation.

A further object of this invention is to provide a bidirection cold-cathode glow transfer tube counting circuit that does not skip counts, omit counts, or produce random miscounts.

A still further objective of this invention is to provide an electronic counting device having increased counting accuracy.

Still another object of this invention is to provide an improved, novel circuit, which facilitates predetermined sequential switching of associated circuits and components.

Another object of this invention is to provide a novel electronic circuit that generates two timely correlated, distinctly shaped, waveform output signals for every single predetermined input waveform signal, which are adapted for sequentially actuating associated responsive equipment.

Still another object of this invention is to provide an improved bidirectional electronic counting circuit for appropriately actuating a decade counter tube such as, for example, a conventional Sylvania type 6476 counter tube.

A further objective of this invention is to provide an improved bidirectional cold-cathode counting circuit incorporating combined resistive-inductive reactance signal transfer characteristics and corresponding output signal waveforms.

Another object of this invention is to provide a bidirectional cold-cathode glow transfer tube counting circuit that is easily and economically manufactured and maintained.

Other objects and many of the attendant advantages of this invention will be readily appreciated as the same becomes better understood by reference to the following detailed description when considered in conjunction with the accompanying drawing wherein.

Figure 1:
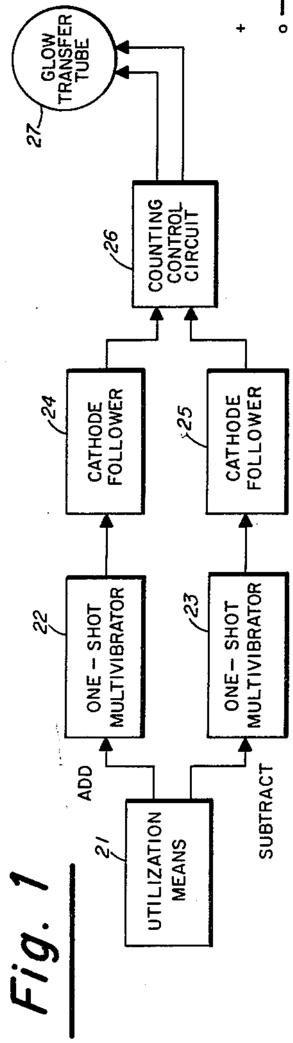
FIG. 1 depicts a block diagram of an exemplary counting system which is otherwise conventional except for the incorporation of the improved counting control circuit constituting this invention.

Referring now to the drawings, wherein like reference characters designate like or corresponding parts throughout the several figures, there is shown in FIG. 1 a utilization means 21 that may actually be any one of a number of utilization means which requires a bidirectional counting readout. For instance, such utilization means could be a computer, a sonar set, a radar set, communications equipment, fire control apparatus, measuring and control instrumentation apparatus, or the like, or any desired combination thereof. Said utilization means has two output signals, one of which represents an addition signal and the other of which represents a subtraction signal for ultimately, subsequently, and effectively adding or subtracting counts at the readout means.

These add and subtract signals are applied, respectively, to a pair of one-shot multivibrators 22 and 23 for further processing into predetermined types of signal waveforms, the outputs of which are then fed, respectively, through a pair of circuit isolation cathode followers 24 and 25 to a counting control circuit 26 where they constitute appropriate input signals thereto which meet the electronic input requirements thereof for subsequent counting control purposes.

Counting control circuit 26 likewise has a pair of output signals, each of which represents the addition and subtraction counts. These output signals are precise and unique in their individual waveforms and relative timing or phasing, as will be more fully explained in the explanation of the operation of the subject invention presented later on. At this point, it should suffice to say that these output signals are of such nature and characteristics as to effect optimization of actuation and energization of the readout means. These tailored output signals, so to speak, are then fed from counting control circuit 26 to a cold-cathode glow transfer tube 27, such as, for example, the Sylvania type 6476 glow transfer tube manufactured by the Sylvania Electric Products, Inc., or the like. Although the preferred embodiment herein discussed includes the aforementioned conventional Sylvania glow transfer tube, it should be understood that any suitable tube or apparatus having basically a neon glow element and many electrodes evenly spaced in a circle inside a tube envelope or suitable sequential switching requirements will suffice.

Figure 2:
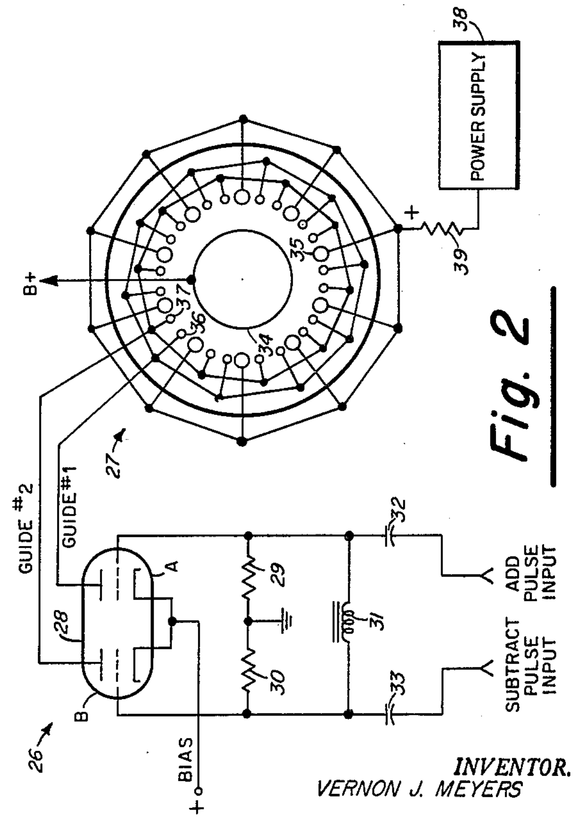
FIG. 2 is a detailed schematic diagram of the counting control circuit constituting this invention combined with a conventional cold-cathode glow transfer tube, likewise illustrated in some detail for purposes of clarity.

FIG. 2 depicts a preferred embodiment of counting control circuit 26 in detail as having a dual triode control tube 28 such as, for example a 5814 tube containing triode sections A and B. The cathodes thereof are connected together and biased at a predetermined positive voltage such as, for instance, eight volts. A pair of forty-seven thousand ohm series connected resistors 29 and 30 interconnect the grids of said triode sections, and the common junction between said resistors is grounded. Also interconnecting said triode section grids and connected in parallel with said series connected resistors is a three-hundred milli-henry choke or inductance 31. A condenser 32 of .01 microfarad capacitance is also connected to the grid of the A section of dual triode tube 28 and acts as the input coupling capacitor for the "add" input signals. Likewise, a condenser 33 of .01 microfarad capacitance is connected to the B section of triode tube 28 and acts as the input coupling capacitor for the "subtract" input signals. The plates of sections A and B of triode 28 are coupled, respectively, to Guides #1 and #2 of the aforementioned glow transfer tube 27.

Although glow transfer tube 27 is considered to be conventional and not invention per se, its combination with the particular detailed components of disclosed counting control circuit does constitute a new and novel arrangement of elements. Because of this, it, too, is hereby defined in some detail in order to facilitate clarity of the disclosure thereof. Thus, it is seen that glow transfer tube 27 contains a positively charged anode 34 which is coupled to a B plus supply voltage of, perhaps, the order of 500 volts. A plurality of count indicator cathodes 35 are interconnected electrically and spatially disposed about said anode. Said count indicators are herein disclosed as being counts or digits from 1 to 10, but it should be understood that any desired number may be employed. A pair of guide members or electrodes 36 and 37 are sequentially disposed between each adjacent pair of count indicators for acting as intermediate voltage transfer steps therebetween. Because these guides play an extremely important part of the operation of the glow transfer tube-count control circuit combination, they will also be referred to as guide #1 and guide #2 to facilitate their correlation with the A and B sections of the aforesaid dual triode tube 28. As can readily be seen from FIG. 2, all #1 guides are electrically connected together and all #2 guides are electrically connected together and, as previously mentioned, are respectively coupled to the plates of triode sections A and B of dual triode tube 28. All count indicators or counts, as they are sometimes known by, are connected to an appropriate power supply 38 through a resistor 39.

Briefly the operation of the subject invention is described as follows.

The add or subtract signals to be subsequently counted are supplied by any pertinent utilization means, are shaped appropriately in their respective one-shot multivibrators, and are passed on through their respetcive circuit isolation cathode followers as input signals similar to that shown in the graph of FIG.3(*a*). In event add signals are being supplied, they are fed to the add pulse input terminals of the counting control circuit of FIG. 2. Of course, if subtract signals are being supplied, they are applied to the subtract pulse input terminal of said counting control circuit.

Since essentially the same procedure takes place in reverse order when subtract signals are supplied as when add signals are supplied, for the sake of brevity, only the add signal application and the functions effected thereby will be herein described. Hence, assuming an add signal such as is characterized as waveform (*a*) of FIG. 3 is applied to the aforementioned add pulse input terminal, it is coupled through capacitor 32 to the grid of triode 28A, causing said grid to change from substantially zero potential to some positive potential, such as for instance, ten volts, for a predetermined period of time such as, for example, eighty microseconds, essentially in accordance with the waveform (*b*) shown in FIG. 3. This positive grid voltage overcomes the eight volt positive cathode bias voltage which, in turn, causes triode 28A to conduct and reduce the plate voltage thereof from several hundred volts (which initially exists thereat due to the inherent anode to guide leakage of the glow transfer tube) to substantially zero potential. In accordance with waveform (*d*) of FIG. 3 the #1 guide thus becomes zero voltage also, and due to the fact that guide #1 becomes more negative with respect to the anode than the adjacent digit indicator, the glow of the glow transfer tube is transferred to this guide. As shown in FIG. 3(*b*), during the next twenty or thirty microseconds, the voltage on the input grid has decreased somewhat, allowing the guide voltage to increase somewhat.

Due to the transfer characteristic defined by the network composed of series connected resistors 29 and 30 and inductance 31 coupled in parallel therewith, the voltage waveform of the grid of triode 28A is timely being transferred to the grid of triode 28B. The transfer occurs substantially in accordance with the path progress of waveform (*c*) of FIG. 3. By the time the grid voltage of triode 28B is maximum, the grid voltage of 28A is reduced, whereby tube 28A is cut off or made non-conductive and triode 28A is made conductive because the grid voltage thereof has likewise overcome the aforesaid eight volt bias. During the time triode 28B is in a conductive condition in accordance with the control voltage waveform (*c*) of FIG. 3, the plate thereof and, consequently, guide #2 are timely reduced to zero potential in accordance with waveform (*e*) of FIG. 3. As can readily be seen from waveforms (*d*) and (*e*), guide #2 is becoming more negative with respect to the anode of glow transfer tube 26 than guide #1. This causes the ionization to shift from guide #1 to guide #2 and, hence, the glow also transfers thereto. The "residual" zero voltage portion represented by the dashed lines of FIG. 3(*e*) effects an exceedingly smooth transfer of the glow from guide #1 to guide #2 without permitting miscounts of digits, omission of counts, or random instability of counts, and this ostensibly produces overall operation which is vastly superior to the known prior art.

After a predetermined period of time, triode 28B ceases to conduct, and guide #2 becomes more positive than the adjacent count indicator, whereupon the glow is transferred thereto to effectively indicate addition of another count.

Figure 3:
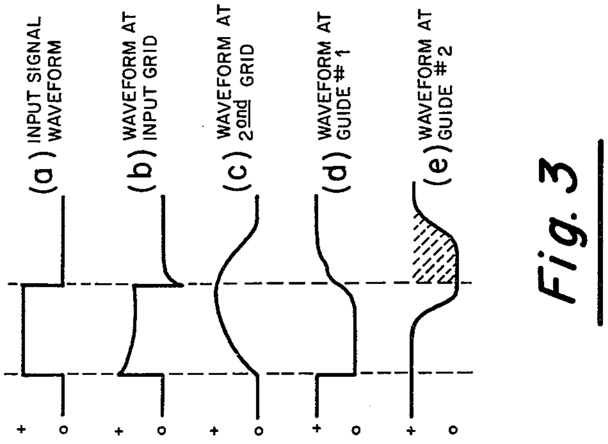
FIG. 3 shows a graph of signal waveforms at various and sundry element positions of the counting control circuit constituting the subject invention.

Since the circuit is symmetrical, applying a subtract pulse comparable to the waveform depicted in FIG. 3(*a*) to the subtract pulse terminal makes the voltage on the guides reverse in like order and moves the glow in the opposite direction to effectively indicate the subtraction of digits or counts at the glow transfer tube, as previously mentioned.

Obviously, many modifications and variations of the present invention are possible in the light of the foregoing teachings. It is, therefore, to be understood that within the scope of the appended claims, the invention may be practiced otherwise than is specifically described.

What is claimed and desired to be protected by Letters Patent of the United States is:

1. A bidirectional cold-cathode counting circuit comprising, in combination, a glow transfer tube having an anode, a plurality of electrically connected digital indicator cathodes spatially disposed about said anode, and first and second guide electrodes uniformly positioned between each of said plurality of electrically connected digital indicators, said first guide electrodes being electrically connected to each other and said second guide electrodes being electrically connected to each other, a first triode having a cathode, a grid, and a plate, a second triode having a cathode, a grid, and a plate, said plates of said first and second triodes being connected to the aforesaid first and second guide electrodes respectively, said triode cathodes being coupled to each other and adapted for connection to a positive bias potential, a pair of series connected resistors interconnecting the grids of said first and second triodes, a ground connected to the interconnecting junction of said series connected resistors, an inductance shunting said series connected resistors and interconnecting said grids, and a pair of input capacitors connected to the grids of said triodes adapted for electrically coupling received add and subtract signals thereto respectively.

2. The device of claim 1 wherein said pair of series connected resistors interconntcing the grids of said first and second triodes are each forty-seven thousand ohm resistors.

3. The device of claim 1 wherein said inductance shunting said series connected resistors and interconnecting said grids is a three hundred milli-henry choke.

4. The device of claim 1 wherein said pair of input capacitors connected to the grids of said triodes adapted for electrically coupling received add and subtract signals thereto respectively are each .01 microfarad condensers.

5. A bidirectional cold-cathode counting circuit comprising in combination, a control tube having a pair of triodes in a single envelope, each of said triodes having a cathode, a plate, and a grid, means electrically interconnecting said cathodes for applying a positive bias potential thereto, a first resistor connected between one of said grids and ground, a second resistor connected between the other of said grids and ground, an inductance interconnecting each of said grids, a pair of capacitors one of which is connected to said one grid and the other of which is connected to said other grid, an add pulse input terminal connected to one of said capacitors, a subtract pulse input terminal connected to the other of said capacitors, a glow transfer tube having a pair of guide electrode sets, and electrical conductor means interconnecting each plate of said pair of triodes and each set of the aforesaid pair of guide sets respectively.

6. In a bidirectional cold-cathode counting circuit, a counting control circuit comprising in combination, a first triode having a plate, a cathode, and a grid, a second triode having a plate, a cathode and a grid, said cathodes being interconnected and adapted for being connected to a positive bias potential, a pair of series connected resistors interconnecting said grids, a ground connected to the common junction of said series connected resistors, an inductance interconnecting said grids, a first input coupling capacitor connected to one of said grids, a second input coupling capacitor connected to the other of said grids, and electrical conductor means connected to each said plates adapted for respective connection with and actuation of predetermined sequentially electrically switched apparatus.

7. A counting control circuit consisting of a dual triode control tube each triode of which has a plate, a cathode, and a grid, electrical conductor means interconnecting said cathodes and a positive bias potential, a first resistor interconnecting ground and one of said grids, a second resistor interconnecting ground and the other of said grids, a choke interconnecting said grids, a first coupling condenser connected to one of said grids, a second coupling condenser connected to the other of said grids, a pair of input signal terminals each of which is respectively connected to said first and second condensers, and a pair of electrical conductors connected respectively to said plates and adapted for respectively interconnecting each of said plates with a set of transfer guides of a glow transfer tube count indicator.

8. The device of claim 7 wherein each of said first and second resistors have forty-seven thousand ohm resistance, each of said condensers have one-hundredth microfarad capacitance, and said choke has three hundred milli-henry inductance.

References Cited in the file of this patent

UNITED STATES PATENTS

| | | |
|---|---|---|
| 2,679,978 | Kandiah | June 1, 1954 |
| 2,693,552 | Steinberg | Nov. 2, 1954 |